Figure 1:
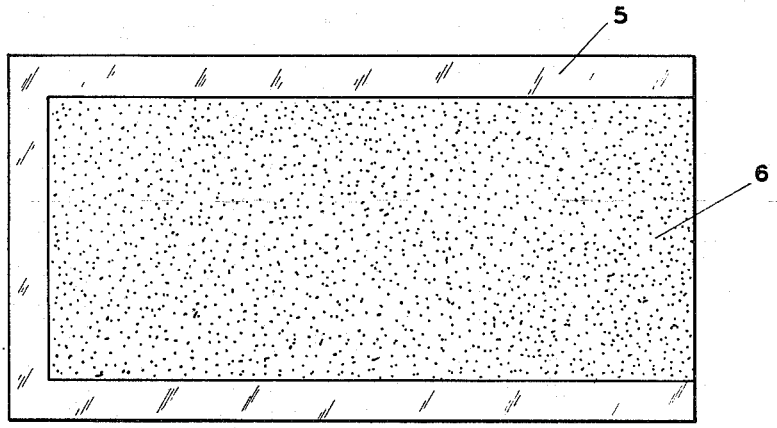

*INVENTOR.*
KERMIT H. BALLARD

Feb. 26, 1946. K. H. BALLARD 2,395,442
ELECTRICAL CAPACITOR
Filed Oct. 15, 1943 2 Sheets-Sheet 2

*INVENTOR.*
KERMIT H. BALLARD
BY
*E. H. O'Brien*
*ATTORNEY*

Patented Feb. 26, 1946

2,395,442

UNITED STATES PATENT OFFICE 2,395,442

ELECTRICAL CAPACITOR

Kermit H. Ballard, Perth Amboy, N. J., assignor to E. I. du Pont de Nemours & Company, Wilmington, Del., a corporation of Delaware Application October 15, 1943, Serial No. 506,368

4 Claims. (Cl. 29—25.42)

This invention relates to new and improved capacitors for use in electrical, radio, and Radar equipment. More particularly, it relates to electrical capacitors formed of ceramic materials wherein the dielectric layers comprise a vitreous material possessing dielectric properties.

Electrical capacitors comprise, as the essential unit thereof, two or more electrically-conductive layers separated by one or more insulating layers of dielectric material. In addition to the essential unit, such capacitors are ordinarily provided with protective insulating cases or coatings, as well as with terminal fastenings, so that they may be incorporated in electrical circuits.

The essential unit of conductive layers separated by insulating layers of dielectric material has, in the past, frequently been formed by providing alternate layers of metal foil separated by sheets of mica, paper, or other sheet material possessing electrical insulating properties. In my copending application, Serial No. 494,627, filed July 14, 1943, I have disclosed a capacitor which comprises a plurality of vitreous enamel dielectric layers separating a plurality of fired silver electrode layers, the whole being positioned on a ceramic tile base which forms a mechanically integral part of the structure. This type of electrical capacitor is characterized by electrical stability and mechanical strength resulting from its monolithic construction. While the ceramic or vitreous capacitors disclosed in my copending application have been somewhat limited as to the electrical capacitance secured because of the relatively large volume occupied by the electrically inactive permanent tile base, certain modifications of this construction are disclosed in certain copending applications assigned to the same assignee which do not possess an electrically inactive permanent tile base. Capacitors of this improved type are disclosed in the following copending applications: Serial No. 504,882, Serial No. 504,883, Serial No. 504,884, Serial No. 504,885, and Serial No. 504,886, all filed October 4, 1943.

As disclosed in said copending applications, electrical capacitors of improved character may be prepared by applying alternate layers of powdered vitreous enamel possessing dielectric properties and powdered silver electrode material on a temporary ceramic base coated with a non-adhesive parting layer. When fired, the vitreous enamel dielectric is fused to form continuous layers of dielectric material, while the powdered silver is similarly sintered to form metal layers or ribbons forming the plates of the capacitors. After firing, the structure is readily separated from the temporary base coated with the non-adhesion or parting layer, thus producing a baseless type of capacitor which is very valuable in the higher capacitance ranges within the dimensions as set by the American Standards Association. Furthermore, the baseless type of capacitor of said copending applications permits the use of any suitable vitreous enamel compositions possessing dielectric properties, and does not require that the thermal expansion characteristics of such compositions be matched with the thermal expansion coefficients of commercially available ceramic base materials as necessary in forming capacitors of the fixed base type.

However, in practice, certain difficulties have been experienced in the manufacture of capacitors of the baseless type as a result of the difficulty of securing perfectly homogeneous vitreous enamel dielectric layers. In the ordinary method of manufacture the powdered vitreous enamel dielectric material suspended in a suitable vehicle is sprayed or otherwise applied over the non-adhesion or parting layer, over layers of metallic silver, and over such portions of previously-applied vitreous enamel layers as are not coated with metallic silver. Unfortunately, air or gases formed by combustion of the vehicle during firing have a tendency to become trapped within the dielectric layers during the firing operation, thereby reducing the effective thickness of said dielectric layers when the resulting electrical capacitor is tested on electrical breakdown tests.

I have now found that these difficulties in the production of ceramic capacitors of the baseless type may be eliminated by utilizing preformed sheets or plates of vitreous dielectric material instead of the sprayed layers of powdered vitreous dielectric material suspended in a suitable vehicle previously employed in the construction of the dielectric enamel layers. It is an object of this invention to render available in the manufacture of ceramic condensers a method employing preformed sheets, layers, or plates of vitreous material, the vitreous composition possessing dielectric properties. Improved ceramic capacitors characterized by all the advantages resident in ceramic capacitors of the baseless type are thus secured. The advantages of the baseless type of ceramic capacitor include relatively high ratios of electrical capacity to the volume of the completed capacitor; freedom from the necessity of matching expansion coefficients of the vitreous material used as dielectric to those of the permanently attached ceramic base;

and high electrical efficiency attainable by utilizing the high Q-factor vitreous compositions disclosed in the copending application of Deyrup, Serial No. 504,888, filed October 4, 1943.

Still another object of this invention is to provide baseless vitreous dielectric capacitors, which capacitors are readily manufactured from prefabricated sheets, plates, bars, or films of high capacity vitreous glass compositions, the electrodes or plates of the capacitor being formed of powdered silver particles, and the whole being capable of being fired in a single firing operation to provide a unitary monolithic capacitor structure. In this way it is possible to utilize in the fabrication of the ceramic capacitor vitreous sheets, foils, films or layers which have previously been fabricated from homogeneous molten glass batches, the resulting products being therefore free from localized two-phase interfaces and variations within the composition of the dielectric layer itself, which irregularities might produce lowered electrical breakdown resistance in the resulting capacitor. These objects, and other objects obtained by my improved electrical capacitors and their method of manufacture, will be apparent from the ensuing disclosure of certain preferred embodiments of my invention.

In producing the new capacitors of the baseless type the plates of the capacitor are preferably formed of a metallic silver powder which, upon firing, is sintered to a continuous ribbon foil or layer of metallic silver. In practicing my invention the powdered silver electrode or plate material, preferably powdered silver suspended in a suitable vehicle, may be applied as a paste or paint by available ceramic decorating processes, such as by spraying, or by the squeegee screen stencil process, to thin sheets of vitreous material of suitable size. The layer of powdered silver metal may be flush with one edge of the preformed vitreous dielectric sheet or layer, but may be spaced away, for example, a distance of at least $\frac{1}{32}''$, from the other three edges of the preformed vitreous plate. The vitreous sheets, together with the applied metallic silver electrode areas, are then stacked to form the complete raw or unfired ceramic capacitor which, upon firing, is fused to the single unitary monolithic electrical capacitor of the baseless type.

Figure 2:
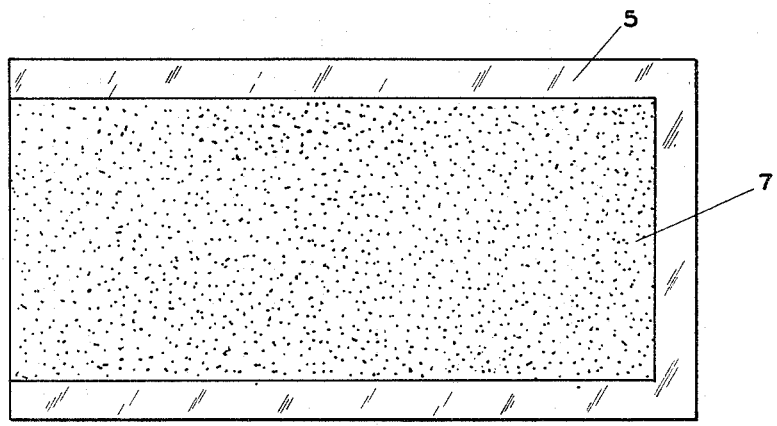
Figure 3:
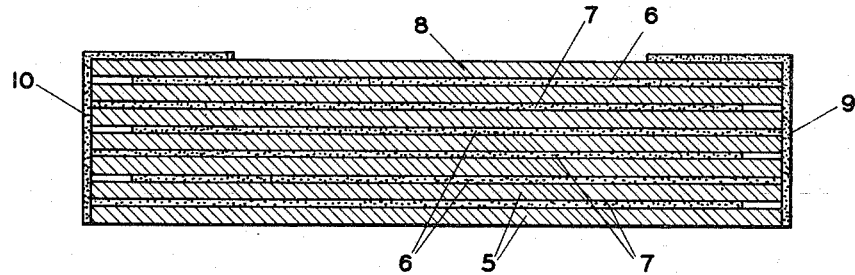
Figure 4:
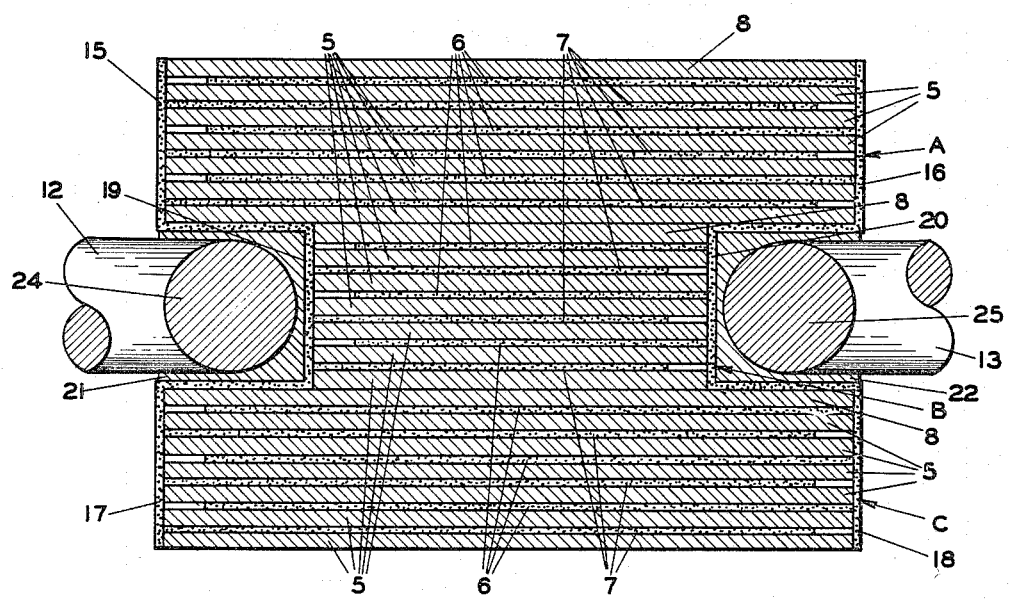

My invention may be illustrated with reference to the attached drawings wherein Figures 1 and 2 represent plan views of the preformed sheets of vitreous material possessing dielectric properties, these sheets being destined to form dielectric layers of the electrical capacitor and being covered at certain portions thereof with a layer of powdered metallic silver. As shown by the difference between Figures 1 and 2, the layer of metallic silver, subsequently to be fused by firing to a silver plate or electrode of the capacitor, is flush with the right-hand edge of the vitreous plate in Figure 1, and flush with the left-hand edge of the vitreous plate in Figure 2. As will be subsequently explained, the plates are alternately constructed in this manner so that they may be stacked up and fired to form the unitary monolithic capacitor of the baseless type. Figure 3 shows one form of completed capacitor, this view being in cross-section, and showing the metal surfaces on the end edges of the capacitor joining alternate plates of the capacitor structure but not showing, however, the electrical lead wires or terminal connections attached thereto. Figure 4 discloses a completed ceramic capacitor of a slightly different type, this view showing electrical lead wires attached thereto in electrical communication with alternate metallic plates of the capacitor.

Referring more specifically to Figures 1 and 2, the numeral 5 denotes the prefabricated sheets, foils, or films of vitreous composition, preferably of a vitreous composition having low-power factor dielectric properties, which prefabricated members when joined together, as shown in Figures 3 and 4, comprise the dielectric layers of a completed ceramic capacitor. As shown in Figure 1, powdered metallic silver layer 6 is applied on top of vitreous member 5, this powdered silver metal suspended in a suitable vehicle being applied flush against the right-hand edge of plate 5 but spaced back a distance of at least $\frac{1}{32}''$ along the three other edges of the vitreous member 5. In Figure 2 the powdered silver suspended in a suitable vehicle is applied to form layer 7 which layer is flush with the left-hand edge of vitreous base 5 but is spaced back at least $\frac{1}{32}''$ along the three other edges of the vitreous base. As previously stated, this powdered silver metal suspended in a suitable vehicle may be applied by spraying on the vitreous base 5, but I prefer to apply layers 6 and 7 to the vitreous base by means of the squeegee screen stencil process, since it is possible by masking the stencil to avoid coating the desired portions of the vitreous base material. After the vehicle drys there results the two types of vitreous plates coated with metallic silver shown at Figures 1 and 2, it being understood, of course, that in practice very large numbers of such plates of both types will be produced, since a commercial ceramic capacitor may have as many as 100 separate layers of dielectric material.

If desired, the vitreous sheets with the applied silver powder suspended in a suitable vehicle (silver paint or paste) may be given a preliminary firing to mature the ceramic silver electrode layer, but this is not necessary as the entire capacitor may be fired at once to a single unitary monolithic structure when built up in finished form as shown in Figures 3 and 4.

In building up the capacitor I stack the desired number of vitreous enamel plates with applied metallic silver areas on a temporary ceramic base provided with a special non-adhering parting layer. This stacking is done in such a manner as to give proper orientation to alternate electrode layers and to build up a capacitor structure having required capacitance. The use of such a temporary supporting base with a non-adhesion layer, such as a layer of calcined bentonite, is disclosed and claimed in the following copending applications assigned to the same assignee: Serial No. 504,882, filed October 4, 1943; Serial No. 504,883, filed October 4, 1943; Serial No. 504,884, filed October 4, 1943; Serial No. 504,885, filed October 4, 1943; and Serial No. 504,886, filed October 4, 1943. For convenience in illustrating, the temporary base and its special non-adhesive parting layer are not illustrated in Figures 3 and 4, which show the improved capacitors resulting after the firing at which time, of course, the temporary supporting base is no longer a part of the structure.

Referring more specifically to Figure 3, it will be noted that I first take a vitreous sheet, plate or film of the type shown in Figure 2 provided with metallic silver layer 7 and place on top of that a vitreous sheet or plate of the type shown in Figure 1 provided with metallic silver area 6. In this way there are built up on the temporary supporting base (not shown) vitreous elements coated with metallic silver of the type shown in Figure 2, and vitreous elements coated with metallic silver of the type shown in Figure 1, these layers being alternately built up until a capacitor having the desired number of dielectric plates is produced. As shown, the uppermost plate 8 is a sheet or plate of the vitreous material, without any silver layer applied thereto.

The unfired stack resulting is then painted across the two ends or edges at which the edges of the plate or electrode layers are exposed with a metallic silver metal paint or paste, this silver metal paint, after firing, maturing to a metallic silver surface which serves the double function of providing electrical communication between alternate plates of the capacitor and providing a surface to which electrical terminals may be attached. In Figure 3 the silver layers resulting on firing which join the edge portions of silver layers 6, and those which join the edge portions of silver layers 7, are designated, respectively, by the numerals 9 and 10. This silver metal paint or paste used to apply the metallic layers 9 and 10 on the edge portions of the capacitor is preferably the same suspension of ceramic silver powder in vehicle used to prepare the electrodes or plates 6 and 7 of the capacitor.

In firing the multi-layer stack of Figure 3 to form the desired unitary monolithic capacitor structure, it is desirable to place on top of the stack a weight coated with a non-adhering film, which weight serves to hold the layers of metal and dielectric forming the capacitor structure in position against the temporary supporting base (not shown) during the firing operation.

If desired, the stack of alternate layers of vitreous material and metallic silver may be built up as shown in Figure 4, utilizing three separate sections, these sections being designated A, B, and C in the drawings. As noted, section B is shorter than sections A and C so that recesses are formed at each end when the three sections are assembled in place, in which recesses the electrical terminals 12 and 13 may be positioned. In this case this construction is in accordance with that disclosed in my copending application, Serial No. 504,887, filed October 4, 1943, and section A is provided at its edge portions with the L-shaped layers of metallic silver 15 and 16, corresponding with layers 9 and 10 of Figure 3. These silver layers, serving to connect alternate silver plates or electrodes of the capacitor, are formed, as those in Figure 3, by painting the edge portions of the stack structure with a suspension of metallic silver in a suitable vehicle. Similarly, section C is provided with L-shaped edge portions 17 and 18 serving to interconnect alternate metallic electrode layers, these surfaces being formed by painting on the edge portions of the stack comprising section C a layer of metallic silver suspended in a suitable vehicle. The intermediate section, section B, is provided with layers of silver 19 and 20 on its edge portions, these layers serving to interconnect alternate plates or electrodes of the capacitor. As shown, there thus results on the interior surfaces of the recesses in which terminal wires 12 and 13 are positioned a continuous silver layer which provides good electrical conduction between the plates of the electrical capacitor and terminals 12 and 13 when the recesses are filled with solder masses 21 and 22, all as in accordance with my previously referred-to copending application, Serial No. 504,887. The solder masses 21 and 22 serve to hold the three sections of the ceramic capacitor together, as well as to hold the terminal wires 12 and 13 in position in the recesses provided therein. These terminal wires may have any desired shape but are shown, as in my copending application, Serial No. 504,887, povided with L-shaped or T-shaped heads, which in Figure 4 are cut in cross-section to form the cut surfaces 24 and 25.

After the elements comprising the raw or unfired capacitor shown in Figure 4 are built up, the whole is fired to provide a single unitary monolithic construction. In practice it is usual not to insert the terminals 12 and 13, nor to fill the recesses in which they are positioned with solder, until after the structure has been fired. In order to secure satisfactory adherence of the solder masses 21 and 22 to silver surfaces 16, 17 and 19, it is desirable, although not in all cases necessary, to burnish the silver surfaces.

In preparing my improved ceramic capacitor I prefer to utilize a suspension of ceramic silver powder in a suitable vehicle for the plates or electrodes, because a layer of such silver particles will coalesce on firing, thereby producing a metal layer having good electrical conductance. Silver metal foil may be utilized also, but has not been found to give as good results as ceramic silver powder layers, probably because the latter layers are porous and permit the escape of air and the gases formed by combustion during firing operations, while silver foil layers produce blisters or bulges of silver foil which are actually projected through adjacent dielectric layers, especially when firing temperatures are utilized which are sufficiently high to produce a fluid state or partially fluid state of the vitreous dielectric material are utilized in the firing operation. Such blisters or bulges projected through adjacent dielectric layers produce electrical short-circuiting or lowered electrical breakdown resistance in the finished capacitor.

While I prefer to utilize metallic silver, aluminum foil can also be utilized as the plate material although not as successfully as powdered metallic silver. The melting point of silver is much higher than that of aluminum, thus permitting the use of higher-melting vitreous dielectric materials. The possibility of utilizing vitreous compositions of higher melting point thus provides a wider range of compositions suitable for use in forming said preformed vitreous elements. For example the high Q-factor vitreous compositions or glasses disclosed in the copending application of Deyrup, Serial No. 504,888, filed October 4, 1943, possess maturing temperatures in the range 650 to 750° C., or well above the melting point of aluminum. Moreover solder adheres very well to ceramic silver layers but does not adhere readily to aluminum surfaces. Copper foil is utilizable, but was found to oxidize readily on firing thereby producing poor electrical contacts necessitating difficult cleaning operations on the exposed copper surfaces. Furthermore, as no ceramic copper powder composition is known, copper, when used, must be applied in the form of a foil, which has not been found to give entirely satisfactory results when utilized in producing baseless vitreous dielectric capacitors employing prefabricated glass sheets as the dielectric layers.

It is understood, of course, that the capacitors illustrated in Figures 3 and 4 may be provided with terminal connections of other types, as well as with protective insulating coatings of any desire type or description.

As various changes may be made in my invention, certain preferred embodiments of which are herein described, without departing from the scope thereof, it is my intention that the scope is to be construed as permitting such variations as are comprehended within the purview of the appended claims.

I claim:

1. The method of manufacturing electrical capacitors of the type wherein the dielectric layers are formed of a vitreous composition having dielectric properties which comprises: coating a plurality of preformed sheets of vitreous material having dielectric properties with layers of a suspension of metallic silver in a suitable vehicle, leaving a portion of said sheets uncoated; stacking the resulting vitreous sheets coated with powdered metallic silver with some uncoated portions overlying each other so that there are provided a number of layers of vitreous composition, portions of which overlie each other and portions of which separate layers of metallic silver; firing the resulting structure so as to sinter and coalesce said particles of powdered metallic silver to continuous layers of silver metal and to fuse said vitreous composition so that the entire structure coalesces and forms a unitary monolithic electrical capacitor.

2. The method of manufacturing electrical capacitors of the type wherein the dielectric layers are formed of a vitreous composition having dielectric properties which comprises: applying to a plurality of sheets of vitreous material possessing dielectric properties layers of a suspension of metallic silver powder suspended in a suitable vehicle leaving a portion of said sheets uncoated, said silver being applied close to the left-hand edge portion on some of said vitreous sheets and close to the right-hand edge portion on other vitreous sheets; stacking the resulting sheets of vitreous composition coated with metallic silver powder with some uncoated portions overlying each other, said sheets being so stacked that a sheet in which the metallic silver extends to the left-hand edge portion thereof alternates with a sheet on which the metallic silver extends to the right-hand portion thereof; and firing the resulting structure whereby said powdered silver is sintered and coalesced to continuous metallic layers, and said vitreous composition is partially fused in such manner that the whole coalesces to form a unitary monolithic capacitor.

3. The method of manufacturing electrical capacitors of the type wherein the dielectric layers are formed of a vitreous composition having dielectric properties which comprises: coating a plurality of sheets of vitreous material possessing dielectric properties with layers of a suspension of metallic silver suspended in a suitable vehicle, said metallic silver suspension being applied close to the left-hand edge on some of said vitreous composition sheets, and close to the right-hand edge on other of said vitreous sheets, but being spaced back from other portions of the edge portions thereof throughout the remaining portions of the surface of said vitreous sheets; stacking the resulting elements, a vitreous sheet having metallic silver applied close to the left-hand portion thereof alternating with a vitreous sheet having metallic silver applied close to the right-hand edge thereof; applying on top of the structure an uncoated sheet of vitreous composition; coating the edge portions of the resulting structure with a suspension of metallic silver powder suspended in a suitable vehicle, said composition serving to provide metallic silver powder connecting, at each edge portion of the resulting structure, alternate layers of the metallic silver which is positioned between the layers of said vitreous composition; firing the resulting structure whereby said silver powder sinters and coalesces to continuous silver metal surfaces, and said vitreous composition partially fuses to provide a unitary monolithic structure; and attaching terminal wires to the exposed metallic silver surfaces on the edge portions of the resulting structure, so that the resulting ceramic condenser can be incorporated in electrical circuits.

4. The method of making electrical capacitors which comprises positioning, in superposed relationship, a plurality of vitreous enamel sheets, each sheet containing on a face thereof a metallized area comprising powdered silver and an uncoated area, some uncoated areas of said sheets overlying each other, and firing said superposed sheets so as to fuse said enamel sheets together and sinter and coalesce the particles of said silver powder to such an extent as to coalesce the entire structure into a solid unitary block.

KERMIT H. BALLARD.